United States Patent
Minshull et al.

(10) Patent No.: US 12,218,618 B2
(45) Date of Patent: Feb. 4, 2025

(54) REGENERATIVE ENERGY DISSIPATION CONTROL IN A MULTICHANNEL DRIVE

(71) Applicant: Hamilton Sundstrand Corporation, Charlotte, NC (US)

(72) Inventors: Stephen Minshull, Bromsgrove (GB); Kyle Ives, Loves Park, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 53 days.

(21) Appl. No.: 17/944,336

(22) Filed: Sep. 14, 2022

(65) Prior Publication Data
US 2023/0083115 A1  Mar. 16, 2023

(30) Foreign Application Priority Data
Sep. 14, 2021 (EP) .................................. 21196637

(51) Int. Cl.
| | |
|---|---|
| H02P 3/18 | (2006.01) |
| H02M 7/493 | (2007.01) |
| H02P 5/74 | (2006.01) |

(52) U.S. Cl.
CPC .............. *H02P 3/18* (2013.01); *H02M 7/493* (2013.01); *H02P 5/74* (2013.01)

(58) Field of Classification Search
CPC .............. H02P 5/74; H02P 3/18; H02M 7/493
See application file for complete search history.

(56) References Cited

U.S. PATENT DOCUMENTS

| | | | | |
|---|---|---|---|---|
| 5,793,168 A | * | 8/1998 | Vitunic | H02P 6/24 318/703 |
| 6,043,996 A | * | 3/2000 | Kumar | H02M 7/5395 363/41 |
| 6,262,555 B1 | | 7/2001 | Hammond et al. | |
| 7,408,319 B2 | * | 8/2008 | Lloyd | H02P 5/74 318/729 |
| 7,511,438 B2 | * | 3/2009 | Melfi | H02P 5/74 318/63 |
| 8,035,332 B2 | | 10/2011 | Filippa et al. | |
| 8,575,875 B2 | * | 11/2013 | Takamatsu | B60L 15/2045 315/306 |
| 9,122,259 B2 | * | 9/2015 | Oka | H02P 5/74 |

(Continued)

FOREIGN PATENT DOCUMENTS

DE  3929407 A1  3/1991

OTHER PUBLICATIONS

Abstract for DE3929407 (A1), Published: Mar. 14, 1991, 1 page.
European Search Report For Application No. 21196637.9, mailed Mar. 10, 2022, 8 pages.

*Primary Examiner* — Rina I Duda
(74) *Attorney, Agent, or Firm* — CANTOR COLBURN LLP

(57) ABSTRACT

A method of controlling dissipation of regenerated power in a multi-channel drive system having a plurality of inverters connected in parallel across an input power supply to drive one or more loads via one or more motors. The method includes determining a circulation current demand for the inverters when the drive system is operating in regenerative mode, the circulating current demand being dependent on the regenerated power and applied to the inverters such that the regenerated power flows through the inverters and is dissipated by the inverters.

8 Claims, 2 Drawing Sheets

(56) References Cited

U.S. PATENT DOCUMENTS

| | | |
|---|---|---|
| 9,461,567 B2 * | 10/2016 | Matsushita ............. H02P 27/06 |
| 10,411,532 B2 | 9/2019 | Lee et al. |
| 2008/0079373 A1 | 8/2008 | Melfi |
| 2016/0020721 A1 | 1/2016 | Ueda |
| 2020/0228037 A1 | 7/2020 | Black et al. |
| 2020/0259428 A1 | 8/2020 | Benarous |

* cited by examiner

REGENERATIVE ENERGY DISSIPATION CONTROL IN A MULTICHANNEL DRIVE

CROSS-REFERENCE TO RELATED APPLICATIONS

This application claims priority to European Patent Application No. 21196637.9 filed Sep. 14, 2021, the entire contents of which is incorporated herein by reference.

TECHNICAL FIELD

The present disclosure is concerned with controlling dissipation of regenerative energy in a multi-channel drive i.e., a drive (or power conversion device) having two or more parallel inverters.

BACKGROUND

There are many applications in which power from a power supply needs to be converted to a power appropriate for driving a load or loads. Many power conversion circuits, also known as drive circuits, use inverters to convert direct current (DC) power to AC power. A rectifier may be provided to convert incoming grid AC power to a DC power that is applied to a DC bus that provides the DC input to the inverter circuitry.

Drives having a single converter and a single inverter coupled via a single DC bus are adequate for smaller applications but for larger motors or loads (e.g. for aircraft propulsors) such single inverter drives would need to be very large. For such applications, drives having multiple inverters connected in parallel have been developed. Such multi-channel drives allow current levels to be kept within the capabilities of commercially available power electronic devices and to minimize the size and weight of the AC feeder circuitry. The parallel inverters are both fed by the same power source and can power one or several loads. The parallel connection also provides benefits in terms of reduced EMI and DC current ripple by enabling phase shifting of PWM carrier signals. The output from each inverter typically drives a three phase motor winding. Multiple sets of three phases may be provided. The multiple sets may be in a common motor housing with a single motor shaft or may be separate motors with their motor shafts combined through a gear box to drive a common load e.g. an aircraft propulsor. Such parallel inverter or multi-channel drives may include two or more parallel inverters.

In most applications using such drives, the system usually operates in motoring mode, where energy is transferred from the power supply, through the inverters and motors, to drive the load. There may, however, be situations in which regeneration occurs e.g. if the load is decelerating or braking and where the load generates energy that is sent back into the system towards the supply. Whilst this regeneration usually only occurs for a small proportion of the time the system is in operation, the system needs to be configured to handle the energy sent back into the system during regeneration mode operation so that the power supply is not damaged. Some drive systems include capacitors or battery banks arranged to store energy generated in regeneration mode, which, of course, adds to the overall size, weight, complexity and cost of the system. If the energy cannot be stored, it needs to be dissipated.

Some systems include a 'regen circuit' or brake resistors between the DC supply and the inverters. The regen circuit/resistor circuit is connected across the DC supply as needed to dissipate the regenerated energy. Again, however, such circuitry adds to the overall weight, size, cost and complexity of the circuit, which, where the regeneration mode only occurs infrequently, adversely affects the power density of the system. Power density is a major factor for many applications where space/permitted weight is limited e.g., in aircraft.

There is, therefore, a need for improved ways of dissipating regenerative energy in such a multi-channel drive.

SUMMARY

According to the disclosure, there is provided a multi-channel drive system having a plurality of inverters connected in parallel across an input power supply to drive one or more loads via one or more motors, the system including means for determining an additional circulation current demand for the inverters when the drive system is operating in regenerative mode, the circulating current demand being dependent on the regenerated power and applied to the inverters such that the regenerated power flows through the inverters and is dissipated by the inverters.

Also provided is a method of controlling dissipation of regenerated power in a multi-channel drive system having a plurality of inverters connected in parallel across an input power supply to drive one or more loads via one or more motors, the method comprising determining a circulation current demand for the inverters when the drive system is operating in regenerative mode, the circulating current demand being dependent on the regenerated power and applied to the inverters such that the regenerated power flows through the inverters and is dissipated by the inverters.

BRIEF DESCRIPTION

Examples of dissipating regenerative energy according to the disclosure will now be described with reference to the drawings. The drawings and detailed description show and describe examples only, and other variations may fall within the scope of the appended claims.

DETAILED DESCRIPTION

Figure 1:
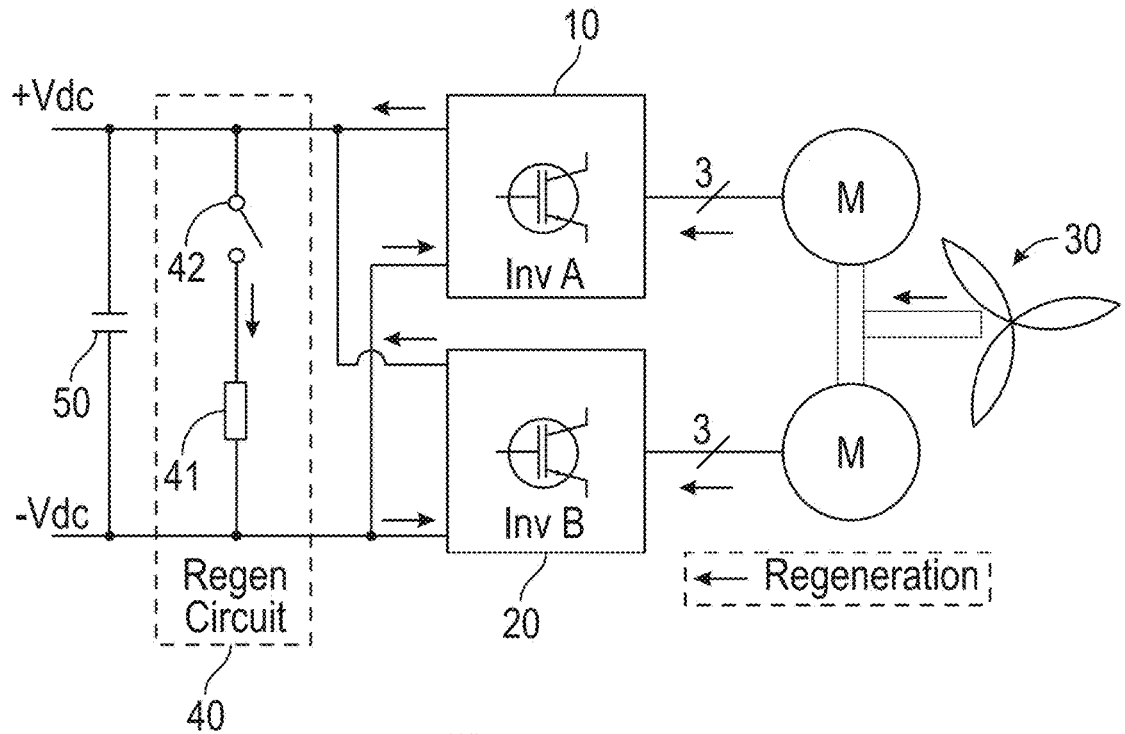
FIG. 1 is a simplified circuit diagram showing a typical parallel inverter architecture.

By way for background, atypical power converter or drive system with a regen circuit will be described with reference to FIG. 1.

Power from a DC supply (+Vdc, −Vdc) is provided to one or more motors M via two or more inverters 10, 20 connected in parallel across the DC supply. The outputs from the inverters 10, 20 drives the motor windings which may then drive a load 30 e.g. a propulsor. In FIG. 1, two parallel inverters 10, 20 are shown, but any number of parallel inverters may be used depending on the application.

In a regeneration mode, energy flows in the direction of arrow 'Regeneration' from the load back towards the DC supply.

To prevent the regenerated energy reaching the supply, a regen circuit 40 is provided across the supply. The regen circuit includes a brake resistor 41 and a switch 42. The resistor 41, when the switch 42 is closed, acts to convert the mechanical energy of the motor during deceleration or braking to heat energy, thus dissipating the energy that is generated in this mode. In more detail, during regenerative mode, the switch 42 is initially open and the energy from the motor M will charge the DC link capacitor 50 and increase the DC link voltage. Once the DC link voltage exceeds a predetermined value due to the regenerated energy, the switch 42 will be closed and energy from the motor will be dissipated by the resistor 41 and the DC link voltage will drop. The process continues, with the switch opening and closing based on the DC link voltage.

As mentioned above, though, one problem with high power applications is that the resistor of the regen circuit may need to be very large to cope with regeneration energy when it does occur, although most of the time, the system will be in the motor mode and the regen resistor 41 will not be used.

The system of the present disclosure allows energy generated in the regeneration mode to be dissipated without the need for a regen resistor/switch circuit. Instead, the system makes use of the existing inverters and motor coils and recirculates the regen energy to be dissipated by the inverters and motor coils.

Typically, the inverters and motor coils will be arranged to provide cooling to the system during normal motoring operation so that the system does not overheat. For example, for a 1 MW propulsion system with inverter and motor efficiencies of 97%, the cooling system must be designed to remove 59 kW of heat energy during normal operation. In regenerative mode, such cooling is not required. Instead, therefore, the existing cooling system can be used to dissipate up to 59 kW of regenerative energy if that energy is circulated back through the inverters and motor coils. With the system of the disclosure, in fact, even more regen energy can be dissipated if losses are allowed to be temporarily stored in the thermal masses of the motor and inverter.

Figure 2:
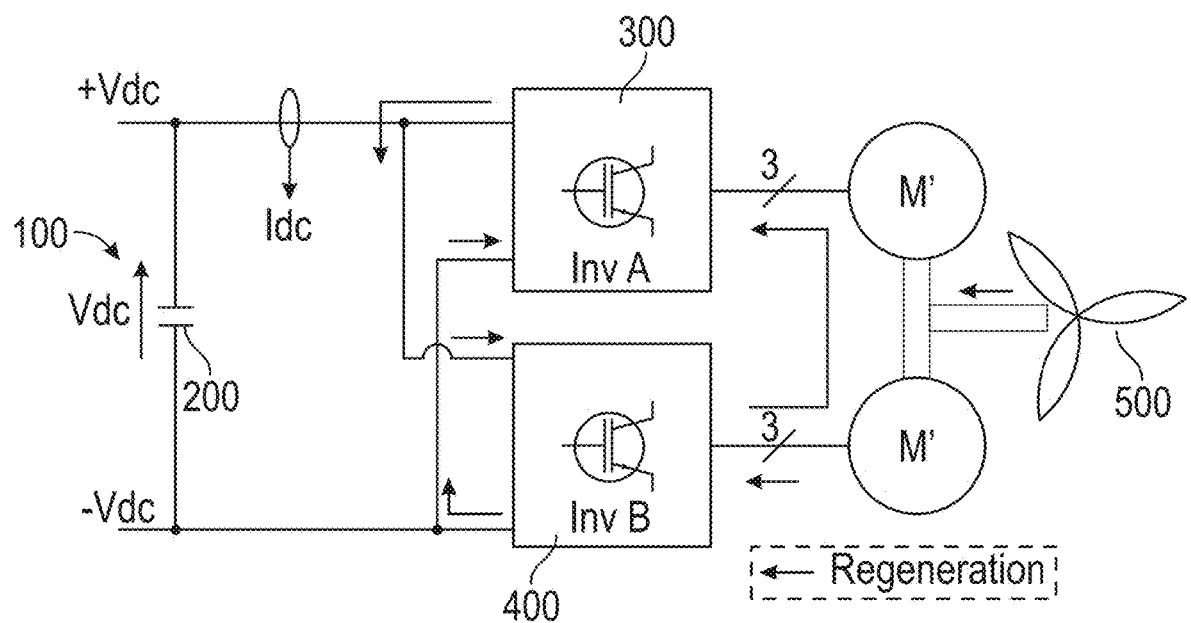
FIG. 2 is a simplified circuit diagram showing a parallel inverter architecture according to this disclosure.

The principles of the present disclosure will now be explained in more detail, by way of example only, with reference to FIG. 2.

In the same way as was described with reference to FIG. 1, the drive of FIG. 2 has a DC power supply 100 (from a DC source, or obtained by rectifying an AC power supply) and a DC link capacitor 200. Two or more inverters 300, 400 are connected in parallel to switch converted power through to the load via motors M' as was described in relation to FIG. 1. Here, the load is a propulsor 500 but the concepts described herein are applicable to drive circuits for other types of load. The system operates in normal motoring mode, transferring power from the DC supply to drive the load in the same way as the conventional systems described above.

If the system operates in regenerative mode, the load acts as a generator and power flows through the system from the load towards the DC supply (see arrow 'Regeneration'). At this time, when the load is decelerating or braking, there will be a braking torque demand on the system. As motor torque is proportional to current, the braking torque demand gives rise to a braking current demand. For a parallel inverter system, this braking current demand is typically equally shared between the inverters to share the load. The total current demand must be equal to the total system demand i.e.: for two parallel inverters A (300) and B (400), the total current demand IqT=IqA+IqB. As mentioned above, typically the total current demand would be equal to the braking current demand. According to the present disclosure, though, the current demands for each inverter can be increased such that the sum is greater than the braking current demand. If the two (or n, for n parallel inverters) currents are increased, more power losses can be dissipated through the inverter and the motor. The system of this disclosure uses this concept to increase the currents to add a circulating current (Icirc) during regenerative mode.

Figure 3:
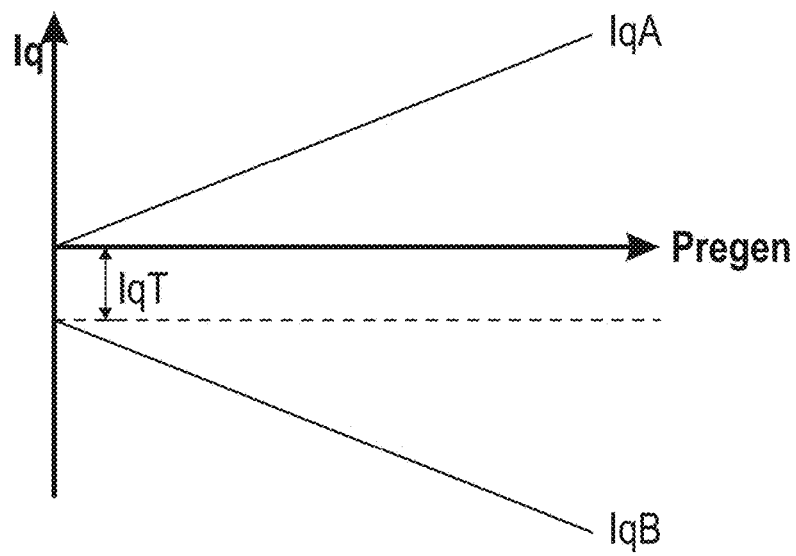
FIG. 3 illustrates the inverter current demand versus regenerative power for two parallel inverters used in controlling energy dissipating according to the disclosure.

In an example, as shown in FIG. 3, IqA=Icirc, although Icirc could be split between inverters.

Thus, the additional current offsets the braking current demand and increases with increasing regenerated power.

By increasing the circulating current Icirc, the power dissipated in the motor and inverters is increased.

During the regenerative mode, the power that needs to be dissipated by the system is proportional to the product of motor torque (T) and motor speed (w) and so the circulating current Icirc is selected based on the motor torque and speed.

The magnitude of the circulating current to be set in the system in order to dissipate the regenerated power can be determined, based on motor torque and speed, in various ways.

One way is to use a look-up table with values of circulating current stored against different values of T and w. The look-up table could be populated with current values that are just enough or that exceed the value needed to dissipate the regenerated power for the given values of T and w. The values can be set up to a dissipation limits of the motors and inverters.

Figure 4:
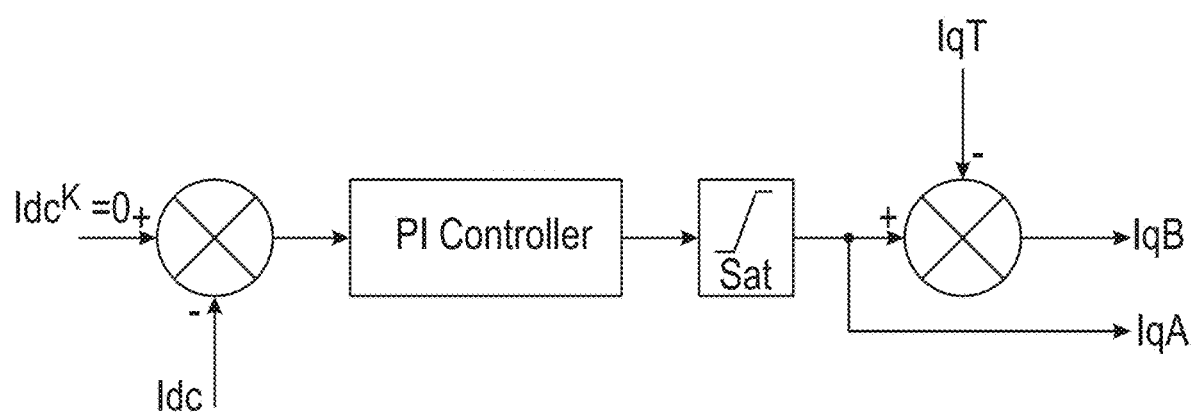
FIG. 4 shows an example of a closed loop controller that can be used in a system according to this disclosure.

Another way of determining the desired Icirc is to use a closed loop controller based on the measured DC inverter input current Idc, as shown in FIG. 4. Usually, a positive Idc indicates motoring mode and a negative Idc indicates regeneration. In the example controller shown, PI controller sets the circulating current demand Icirc so that the measured input current Idc is controlled to zero. Controlling the input current in this way minimizes the system power losses, whilst still inhibiting regeneration. The offset IqT is added to the inverter current demands to ensure that the correct braking torque is applied at the load. A saturation function is placed on the circulating current demand to limit the maximum circulating current to within the capabilities of the motor and inverter.

An alternative method may use a closed loop controller but the control is based on the DC input voltage rather than current. Regeneration is indicated when the DC-link voltage begins to rise with respect to the DC input voltage as described briefly above in the Background. This voltage differential can be used as an input to the closed loop controller to determine the inverter currents to ensure regen power dissipation.

The techniques described above allow small amounts of regeneration power to be dissipated in multi-channel drives without the need for additional regen components or circuits. The system automatically controls the circulating current to minimize power dissipation while ensuring that the regenerative power is dissipated.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method of controlling dissipation of regenerated power in a multi-channel drive system having a plurality of inverters connected in parallel across an input power supply to drive one or more loads via one or more motors, the method comprising:
   determining a circulation current demand for the inverters when the drive system is operating in regenerative mode, the circulating current demand being dependent on the regenerated power, wherein the circulating current demand is determined based on a motor torque and a motor speed;
   setting a total current demand of the plurality of inverters, wherein the total current demand to be equal to the circulating current demand plus a braking current demand, wherein the braking current demand is proportional to a braking torque of the system; and
   applying the total current demand to the inverters such that the regenerated power flows through the inverters and is dissipated by the inverters.

2. The method of claim 1, wherein the circulating current demand is determined from a look up table.

3. The method of claim 1, wherein the circulating current demand is determined based on measured DC inverter input current in a closed loop control.

4. The method of claim 1, wherein the circulating current demand is determined based on measured DC input voltage in a closed loop control.

5. A multi-channel drive system having a plurality of inverters connected in parallel across an input power supply to drive one or more loads via one or more motors, the system including:
   means for determining an additional circulation current demand for the inverters when the drive system is operating in regenerative mode, the circulating current demand being dependent on the regenerated power, wherein the circulating current demand is determined based on a motor torque and a motor speed; and
   means for setting a total current demand of the plurality of inverters to be equal to the circulating current demand plus a braking current demand, wherein the braking current demand is proportional to a braking torque of the system and applying the total current demand to the inverters such that the regenerated power flows through the inverters and is dissipated by the inverters.

6. The system of claim 5, wherein the means for determining includes a look up table storing circulating current demand values for different motor speeds and motor torques.

7. The system of claim 5, wherein the means for determining includes a closed loop controller configured to determine circulating current demand based on DC inverter input current.

8. The system of claim 5, wherein the means for determining includes a closed loop controller configured to determine circulating current demand based on DC input voltage.

* * * * *